Jan. 11, 1949.  R. L. HIBBARD  2,459,075
PIPE CUTOFF MACHINE
Filed April 3, 1945  4 Sheets-Sheet 1
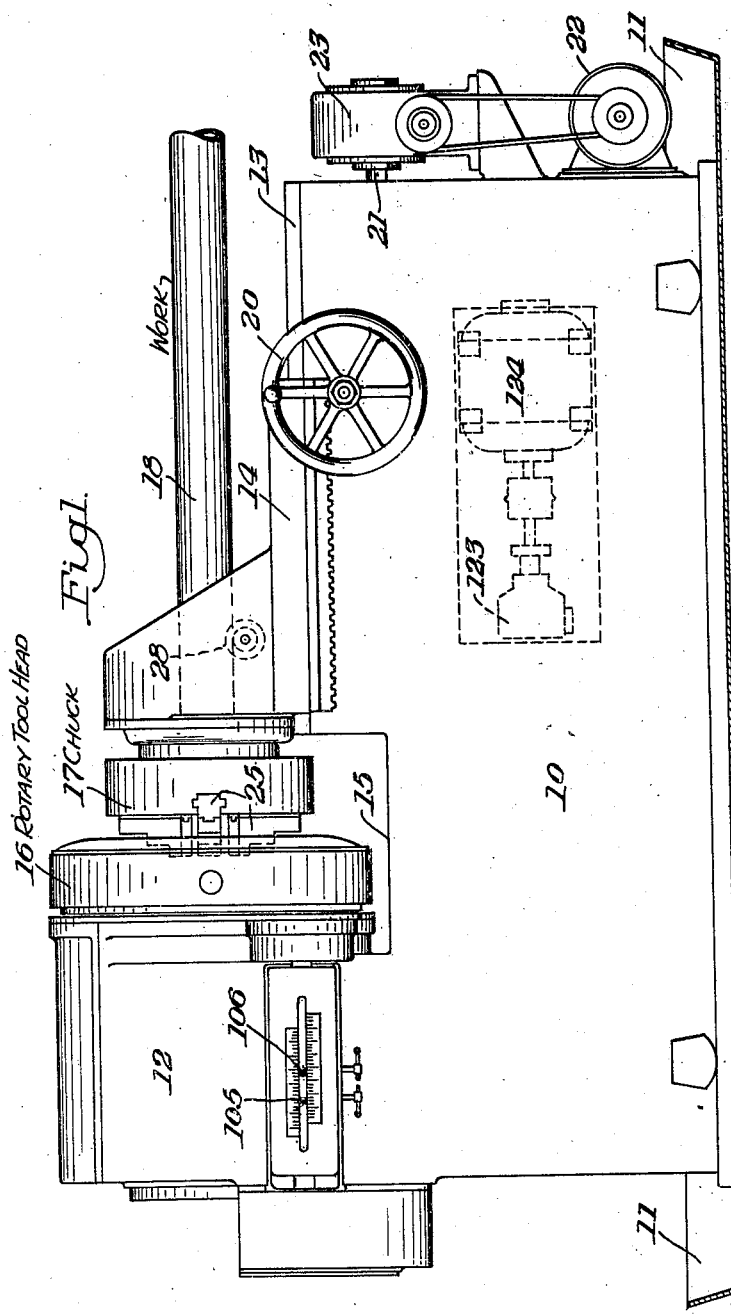
Robert L. Hibbard
DECEASED
INVENTOR.
S.C. Hibbard, R.L. Hibbard Jr
BY & H.M. Junkin, Executors Jan. 11, 1949.    R. L. HIBBARD    2,459,075
PIPE CUTOFF MACHINE
Filed April 3, 1945    4 Sheets-Sheet 2
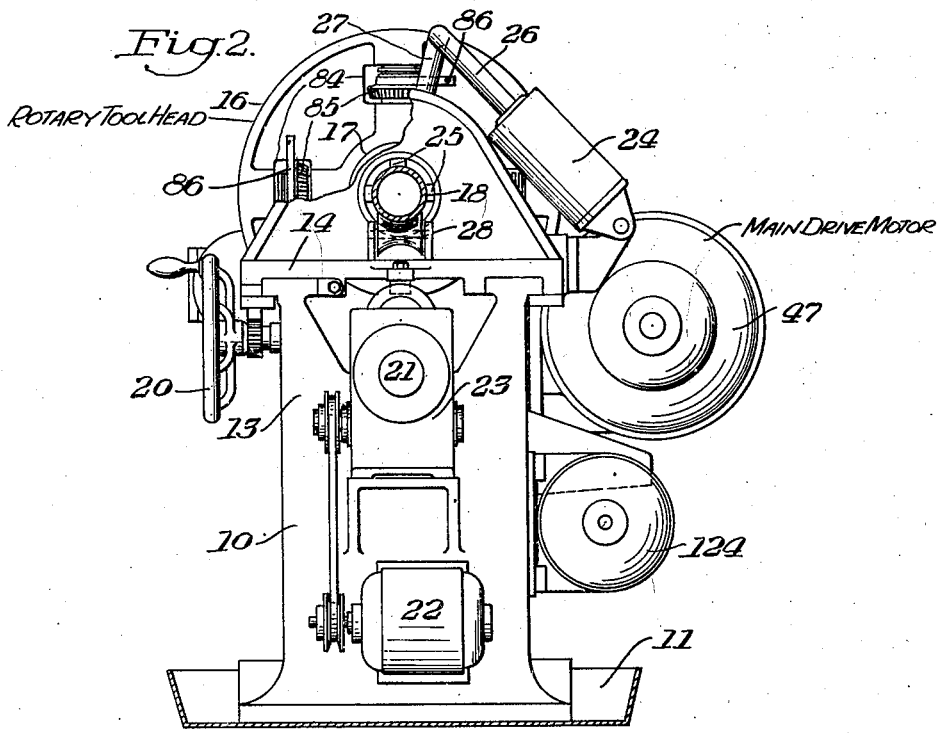
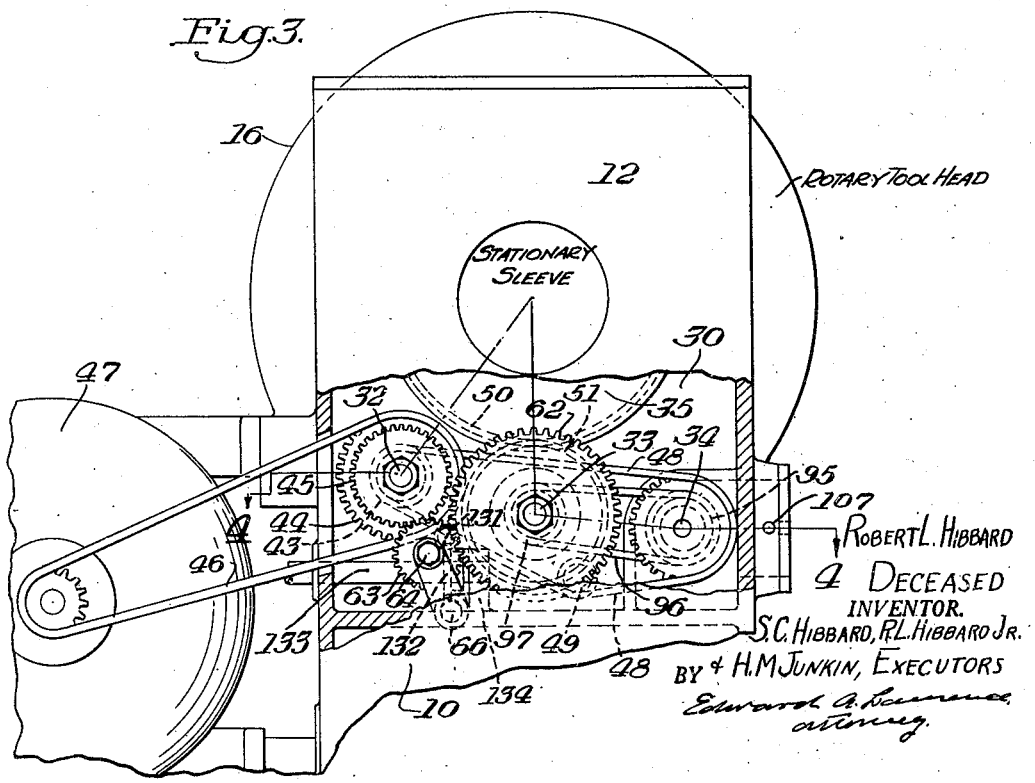

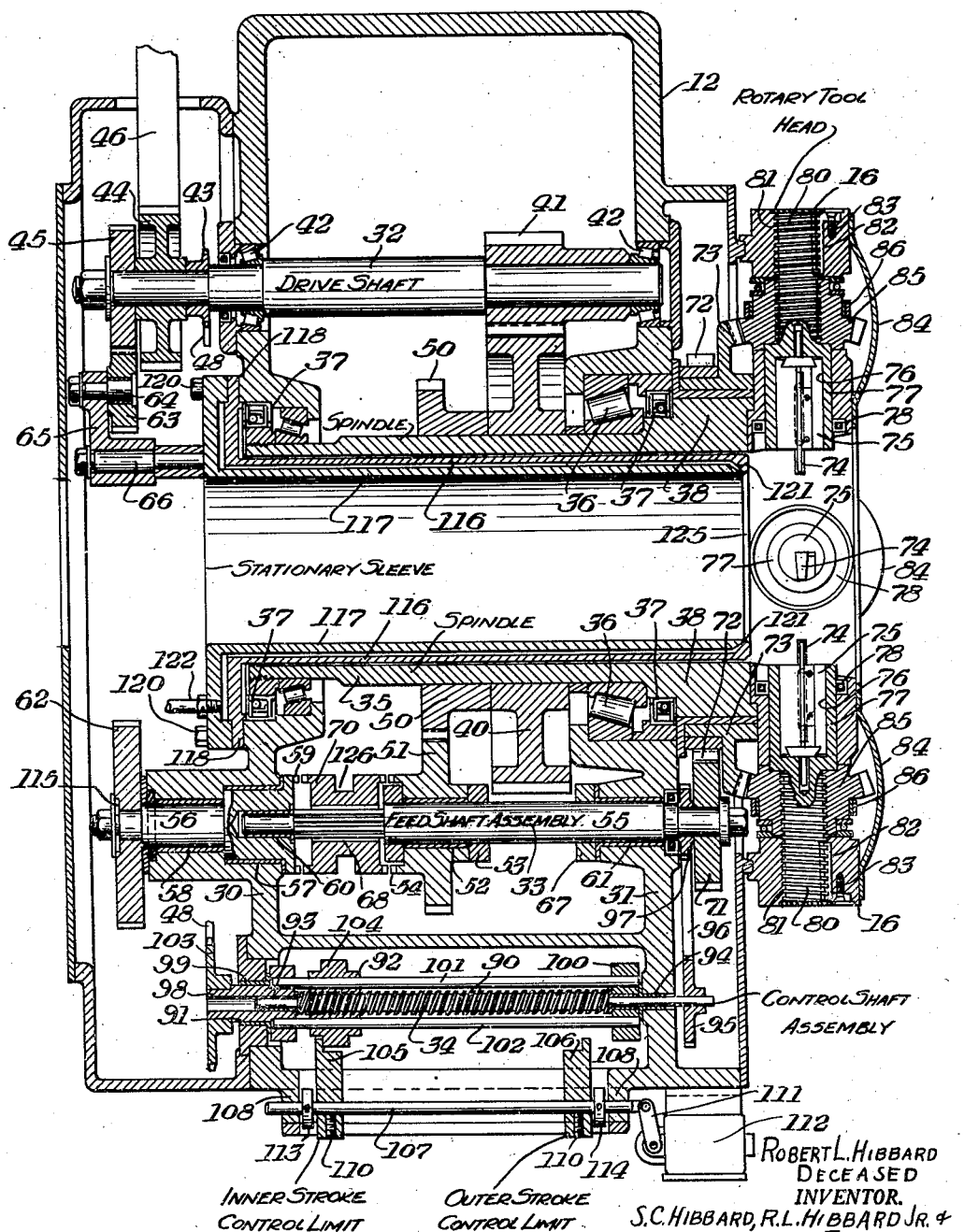

Jan. 11, 1949. R. L. HIBBARD 2,459,075
PIPE CUTOFF MACHINE
Filed April 3, 1945 4 Sheets-Sheet 4
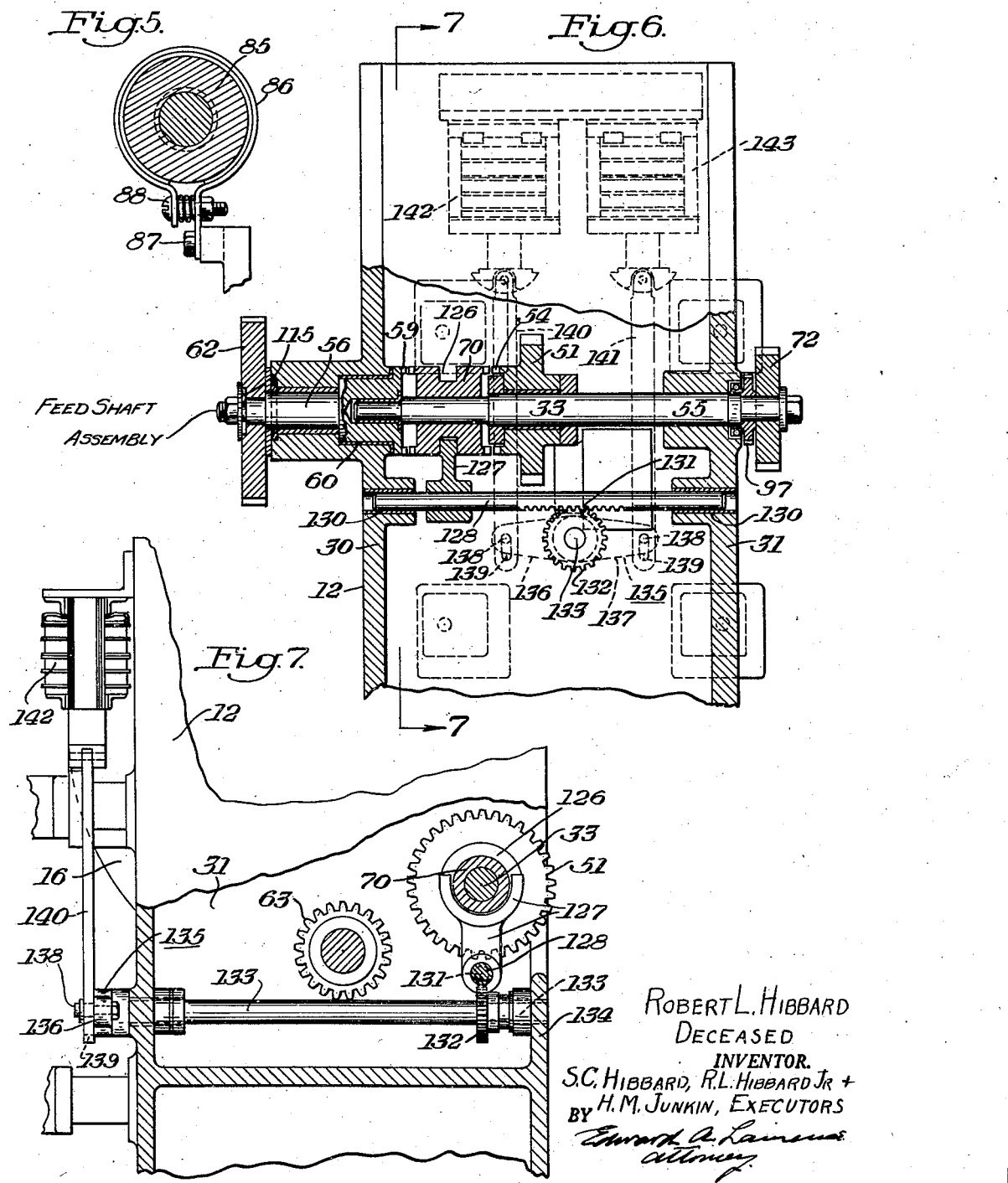

Patented Jan. 11, 1949

2,459,075

UNITED STATES PATENT OFFICE 2,459,075

PIPE CUTOFF MACHINE

Robert L. Hibbard, deceased, late of Bellevue, Pa., by Stewart C. Hibbard, Ross Township, Allegheny County, and Robert L. Hibbard, Jr., and Hays M. Junkin, both of Bellevue, Pa., executors, assignors of one-half to William K. Stamets, Mars, Pa.

Application April 3, 1945, Serial No. 586,401

13 Claims. (Cl. 164—60)

This invention relates generally to machines for machining or cutting off scrap ends or measured sections of pipes, rods, bars and the like, and more particularly to the structure for rotating, feeding and retracting the cutting tools.

The principal object is the provision of an automatic machine tool having machining or cut off tools with a variable stroke for cutting work pieces of different diameters or shaping a work piece by cuts of different depths.

Another object is the provision of a rotary sleeve supporting a tool head and having a stationary guide sleeve for supporting the severed sections of pipe.

Another object is the provision of enclosed and sealed tool holders which are not subject to damage and wear due to cuttings, cutting lubricant and foreign material.

Another object is the provision of a drive to idle, feed, or rapid traverse tools of the cutting head from the same driving source for rotating the cutting head.

Another object is the provision of a variable speed motor to produce a constant peripheral speed for work pieces of different diameters in a cut off machine.

Another object is the provision of varying the length of the cutting tool stroke and its radial position relative to the axis of the work.

Another object is the provision of means for automatically feeding, retracting, and stopping the cutting tools in performing a complete operation on the work piece in this machine tool.

Another object is the provision of a stationary hollow guide sleeve in a machine tool arranged to feed lubricant to the tools of a rotary cutting head.

Another object is the provision of an improved feed drive shaft arrangement in an automatic machine tool.

Another object is the provision of means for setting the length and position of the stroke of the cutting tools in the rotary head of a machine tool.

Another object is the provision of means for automatically starting and stopping the feed of the cutting tools in a machine tool.

Other objects and advantages of this invention appear from the drawings of the machine and in the following description and claims.

A practical embodiment illustrating the principles of this invention is shown in the accompanying drawings wherein:

Fig. 1 is a view in elevation of the front of the machine tool.

Fig. 2 is a view in elevation of the right end of the machine tool.

Fig. 3 is an enlarged view in section of the left end of the machine tool.

Fig. 4 is an enlarged view in section of the spindle, drive, feed and limit control shafts of the machine tool taken on the line 4—4 of Fig. 3.

Fig. 5 is a detailed sectional view of the friction band on the holder.

Fig. 6 is a view in section showing the clutch actuating mechanism.

Fig. 7 is a view in section taken along the line 7—7 of Fig. 6.

Referring to Figs. 1 to 3 of the drawings the cut off machine bed 10 is a large hollow casting that rests in the lubricant drip pan 11 and extends upwardly on the left to form the head stock housing 12 arranged to support and enclose the rotary drive and feed of the machine tool. The right or tail stock portion 13 of the bed 10 is provided with ways for slidably supporting the carriage 14. The intermediate portion of the bed 10 is recessed at 15 to provide clearance for the rotary cutting head 16 carried by the head stock housing 12 and the stock chuck 17 supported by the carriage 14 which clamps the pipe or work piece 18 while it is being worked on by the rotary tool head 16. The carriage 14 has the usual rack and pinion, the latter being fixed to the shaft of the handwheel 20 for manually moving the carriage 14 back and forth along the ways of the bed. The carriage movement is powered through the rotary screw shaft 21 which is threadably received in a nut mounted on the under side of the carriage and is not shown. The shaft 21 is operated by the variable speed reversing motor 22 through the speed reducer 23. The circuit of the carriage motor is interlocked with the machine tool. Switch actuating stops are adjustably mounted on te ways and arranged to be engaged by the carriage for stopping the motor 22 when the carriage has reached a predetermined retracted or advanced position.

The chuck 17 illustrated is a standard type chuck operated by the air cylinder 24 shown in Fig. 2 and is provided with a plurality of gripping jaws 25 which close upon the work piece 18 when the piston 26 in the pneumatic cylinder 24 rotates the lever 27.

The work piece stock such as the pipe 18 is supported by stands positioned to the right of the machine and the end of the pipe that is in the machine is supported by the roller 28 mounted on the carriage 14 when not clamped by the chuck. When the pipe is free and not clamped by the chuck, the carriage can be retracted by the motor 22, or handwheel 20 if the drive of the former is disengaged, until the proper length of the pipe 18 extends beyond the chuck 17. The cylinder 24 is then energized to clamp the pipe and the motor 22 is reversed, causing the carriage to move the pipe into the correct position within the rotary cutting head 16 by deenergizing the motor 22 at the proper time through the stop switches.

The head stock housing 12 is rectangular in shape as shown in Fig. 3 and is provided with transverse walls 30 and 31, as shown in Fig. 4, which have machined openings for receiving the bearings that support the shafts of the driving and feeding mechanism of the rotary tool head.

There are three principal shaft structures in the driving and feeding mechanism of this machine tool; the drive shaft 32, the feed shaft assembly 33, and the limit control shaft assembly 34. The sectional view of Fig. 4 is taken through the axis of the drive shaft 32 to the axis of the spindle 35, back to the axis of the feed shaft assembly 33 and through the axis of the limit control shaft assembly 34. As shown in Fig. 3 these four axes are not in a common plane but the showing of Fig. 4 simplifies the discussion of the structure.

The spindle 35 is rotatably supported by the spaced frictionless bearings 36 carried by the walls 30 and 31 and are sealed at the outside by the oil seals 37. The right end of the spindle is enlarged as shown at 38, extending beyond the housing 12 to receive the rotary head 16 which is secured thereto. Intermediate of its ends the spindle 35 has the gear 40 fastened thereto that meshes with the pinion 41 on the drive shaft 32 which is rotatably supported on the spaced bearings 42 carried by the walls 30 and 31. The left end of the drive shaft 32 extends beyond the wall 30 to receive the limit control drive sprocket 43, the main drive sprocket 44, and the feed drive gear 45 in the order named. The main drive sprocket 44 is connected by the chain 46 to the variable speed main drive motor 47 shown in Figs. 2 and 3. Thus the motor 47 rotates the spindle 35 and the rotary tool head 16 through the drive shaft 32. A suitable rheostat, not shown, is provided to vary the speed of rotation of the spindle and drive shaft.

A second gear 50 is provided on the spindle 35 adjacent the gear 40 and meshes with the gear 51 that idles on the bearing 52 on the feed shaft section 55. The bearing 52 and the gear 51 are held in place by the collars 53 attached to the shaft section 55. The left side of the gear 51 is provided with an axially extending cylindrical flange having an annular series of projections to provide a detent clutch face 54.

The feed shaft assembly 33 is made up in two sections, the long section 55 and the short section 56. The section 56 is short having large and small diameters journaled in the sleeve bearings 57 and 58 mounted in the wall 30. The inner end of the short section 56 is provided with a detent clutch face 59 opposed to the clutch face 54.

The long feed shaft section 55 of the feed shaft assembly 33 is journaled at its left end in the sleeve bearing 60 carried in the bore of the large diameter end of the short shaft section 56 and the right end of the shaft section 55 is journaled in the sleeve bearing 61 mounted in the wall 31 of the housing 12 and extends therebeyond.

The outer end of the short shaft section 56 has the gear 62 pinned thereto which meshes with the idler gear 63 journaled on the stub shaft 64 carried on the outer end of the movable arm 65 that pivots on the stud 66 secured to the housing 12. The idler gear 63 also meshes with the gear 45. Thus the motor 47 rotates the drive shaft 32 and the gear 45 to drive the feed shaft section 56 through the constantly meshed gears 45, 62 and 63 which are enclosed by a cover plate.

The idler gear 63 rotates the short feed shaft section 56 in the same direction as that of the drive shaft 32 and it also permits changing of one or both of the gears 45 and 62 to change the relative speeds of the shafts 32 and 33 without making any other changes in the drive to produce a different rate of feed of the cutting tools for the same speed of rotation of the head 16.

The long section 55 of the feed shaft assembly 33 is held in place by the collar 67 which abuts against a washer seated on the end of the housing of the sleeve bearing 61 carried by the wall 31. The other end of the shaft is arranged with one or more keys 68 which slidably lock the clutch member 70 to the shaft. The clutch member 70 has mating detent clutch faces on each end thereof to engage either clutch face 54 or 59 and its deenergized position is out of engagement or neutral, as shown in Fig. 4.

If the clutch member 70 is moved to the left into engagement with the clutch face 59 the feed shaft section 55 is driven at a slower speed and in the same direction as the drive shaft 32 by the short shaft section 56. The gear 62 has one less tooth than it would normally have to cause the feed shaft assembly 55 to rotate at a definite speed relative to the drive shaft 32. Thus having one less tooth the gear 62 drives the feed shaft assembly 55 at a selected speed which is just a little faster than said definite speed. This differential speed produces the desired amount of tool feed per revolution of the cutting head 16. However the gears 45 or 62 may be changed to vary this differential in the speed of the drive shaft and the feed shaft assembly.

By moving the clutch member 70 to the right to engage the detent clutch face 54 the shaft section 55 of the feed shaft assembly 33 is rotated from the drive shaft 32 and the gears 41 to 40 and 50 to 51 in sequence. The shaft section 55 thus rotates in the same direction as before but at a much slower speed.

Outside of the wall 31 the right end of the feed shaft 55 is provided with the spur gear 71 which meshes with the ring gear 72 secured to the hub of the beveled ring gear 73 which is journaled on the enlarged end 38 of the spindle 35. The ring gear 72 and the beveled ring gear 73 rotate as a unit and may be driven by the feed shaft assembly 33 at different speeds relative to the speed of rotation of the spindle 35 and the tool head 16.

The tool head 16 is provided with a plurality of radially disposed tools 74, four of which are indicated and each is adjustably set and held in place by a wedge block fastened with screws in the plug 75 that is received in the keyed socket 76 of the tool holder 77. The plug is held in the socket by a set screw, not shown. The plugs 75 are removed from their sockets when the tools are to be changed or shapened, after which they are gauged and then inserted in the sockets 76 which receive and maintain the plugs 75 in the same relative position in the head. Thus by gauging the tools relative to the plugs 75 the tools are pre-set before they are inserted in the machine and do not have to be gauged when in cutting position. This saves a considerable amount of time in setting up the machine and is a particular advantage of this invention.

The tool holders 77 are cylindrical in shape and are snugly received in radially disposed bores in the tool head 16. A circular seal 78 is provided for each tool holder to prevent the entry of dirt in the bores. The outer portion of the tool holders 77 are reduced threaded sections 80. The flat crests of the threads fit the bore 81 of the tool head. One or more slots are cut longitudinally in the threaded portion 80 of the tool holder 77 to receive the keys 82 which are secured to the tool head 16 by the screws 83. Thus the keys 82 prevent the tool holders 77 from rotating in their mating radial bores of the tool head 16.

At each tool head position a window 84 is formed in the tool head 16 to receive the beveled pinions 85, the bores of which are threaded to mate with the threads on the sections 80 of the tool holders 77. Thus the internally threaded beveled pinions 85 act as nuts and when rotated will move each of the tool holders 77 radially in or out since the windows 84 and the thrust bearing prevent the beveled pinions from moving axially in either direction.

Each of the beveled pinions 85 meshes with the beveled ring gear 73 and the former will rotate to move the tool holders radially if there is a relative speed between the rotation of the beveled ring gear 73 and the tool head 16 even though they are traveling in the same direction. Thus a differential in speed between the tool head and the beveled ring gear will feed or retract the tools and a synchronous speed between these members will maintain the tools at a constant radial position.

This shaft and gear structure thus provide a drive for feeding or retracting the tools by differential speeds and may be further illustrated by the assumption of ratios of the gears together with the assumption of a spindle or tool head speed. When facing the machine tool in Fig. 1 the tool head 16 will rotate toward the operator or counterclockwise in Fig. 2 and clockwise in Fig. 3. Assuming the spindle and tool head speed to be 100 R. P. M. and the gear 40 and pinion 41 having 70 and 14 teeth respectively the speed of the drive shaft 32 would be 500 R. P. M. and rotate counterclockwise in Fig. 3. When the feed shaft assembly 33 is driven by the spindle with the clutch 70 moved to the right, and the gears 50 and 51 having 68 and 33 teeth respectively, the feed shaft section 55 will rotate in a counterclockwise direction in Fig. 3 at a speed of 203 R. P. M. When the feed shaft assembly 33 is rotated by the drive shaft and the clutch 70 is moved to the left with the gears 45 and 62, having 75 and 123 teeth respectively, the feed shaft will rotate in a counterclockwise direction in Fig. 3 at a speed of 305 R. P. M. Thus in either position of the clutch 70 the feed shaft rotates in the same direction but the speed to feed is 305 R. P. M. while the speed to retract is 203 R. P. M.

The spur gear 71 is assumed to have 25 teeth and the ring-gear 72, 75 teeth. The ring gear 72 will then rotate at 101.5 R. P. M. to feed the tools radially into the work when the clutch 70 is shifted to the left and the ring gear 72 will rotate 67.7 R. P. M. when the clutch member 70 is shifted to the right to retract the tools. Thus when feeding the tools into the work the ring gear moves slightly faster than the tool head and when retracting the tools the ring gear moves much slower than the tool head, yet in each case they are rotating in the same direction.

In following this action to the tools themselves it will be noted that during the feeding operation the ring gear moves faster. Let it be assumed that the tool head is not rotating and the ring gear moves at 1.5 R. P. M. The latter walks around the tool head and the beveled pinions 85 rotate in a counterclockwise direction when viewed from the outer ends. The thread on the section 80 is a right hand thread and the tool holders are fed radially inwardly at a rate determined by the pitch of the threads and the differential speed.

During the tool retracting period, the ring gear moves at the rate of 67.7 R. P. M. while the tool head travels at 100 R. P. M. which produces a differential of 32.3 R. P. M. If it is assumed that the ring gear is not rotating then the tool head walks around the ring gear at the rate of 32.3 R. P. M. and the beveled pinions 85 rotate in the opposite direction or clockwise and at a rate of 22.5 times as fast as the feed. Thus the position of the clutch member 70 determines whether the tools are fed or retracted.

When the clutch member 70 is in its neutral position and the cut off machine is rotating section 55 of the feed shaft assembly 33 idles and is driven by the ring gear 72. A friction band 86 surrounds the hub of the beveled pinion 85 with one end secured to the head by the bolt 87 and the free end is fastened by means of the bolt 88 to the supporting end of the band, the bolt 88 passing through aligned holes in the friction band 86 and a helical spring is compressed between the band ends. This friction band permits the beveled gear 85 to drive the tool holders in and out but prevents any relative movement between the beveled ring gear 73 and the beveled pinions 85 when the clutch member 70 is in its neutral position. Thus the beveled pinions 85 drive the ring gears and section 55 of the feed shaft assembly 33 at 300 R. P. M. or synchronous speed and no radial movement is imparted to the tools.

The length and position of the radial stroke of the tools 74 is controlled by limit control shaft mechanism 34. This shaft is also made of two independently driven sections, the inner threaded shaft 90 and the drive 91 for the nut 92 which threadably engages the shaft 90.

The threaded shaft 90 has reduced ends which are journaled in the sleeve bearings 93 and 94. The latter is mounted in the right wall 31 and the shaft extends therebeyond to receive the sprocket 95 that is driven by the chain 96 from the sprocket 97 secured to the section 55 of the feed drive shaft assembly 33. The sprocket 95 has 24 teeth and the sprocket 97 has 20 teeth.

The bearing 93 is inserted in the bore of the sleeve shaft 98 that is journaled in the bearing 99 carried by a flanged insert mounted in the left wall 30. The inner end of the sleeve shaft 98 is enlarged and is provided with two openings positioned diametrically on opposite sides of the shaft 90. A collar 100 of the same dimensions as this enlargement is journaled on the shaft 90 adjacent the other end and is likewise provided with two openings. These openings are arranged to receive the adjacent ends of the drive rods 101 and 102 which have a press fit therein and pass through clearance holes in the nut 92. The outer end of the sleeve shaft 98 has the sprocket 103 secured thereto and is driven by the chain 48 by the sprocket 43 on the drive shaft 32. A take-up idler sprocket 49 is provided to permit the chain 48 to clear the feed shaft assembly 33. The sprocket 43 has 21 teeth and the sprocket 103 has 42 teeth.

If the drive through the sprockets 95 and 97 to the threaded shaft 90 from the feed shaft assembly 33 operating at 300 R. P. M. is the same speed as the drive 91 through the sprockets 43 and 103 from the drive shaft 32, the nut 92 will rotate but will not move longitudinally of the threaded shaft 90 as both of these drives would be in synchronism. This condition occurs when the clutch member 70 is in its neutral position and the control shaft mechanism 34 travels at 250 R. P. M. The sleeve shaft 98 and nut 92 operate at this speed continuously when the drive shaft rotates at 500 R. P. M. and the shaft 90 is operated at 250 R. P. M. by the sprockets 95 and 97.

If the feed shaft assembly 33 is traveling at 305 R. P. M., the speed of the screw shaft 90 would be 254 R. P. M. and the differential between the speed of the nut 92 and the shaft 90 is 4 R. P. M., the latter traveling faster which causes the nut 92 to move to the left as the thread on the screw shaft 90 is a left hand thread. Movement of the nut 92 to the left is then a feeding movement.

When the feed shaft assembly 33 is traveling at a speed of 203 R. P. M. the speed of screw shaft 90 is 169 R. P. M., making a speed differential of 51 R. P. M. between the nut 92 and the screw 90, the former traveling at the faster rate. Under these circumstances, the nut 92 moves to the right at the rate of fifty-one times the pitch of the screw thread per minute. This period represents the rapid retraction of the tools.

The nut 92 has a radial cylindrical flange 104 arranged to engage the left and right trip fingers 105 and 106 respectively which are arranged to be adjustably fastened on the control rod 107 journaled in the spaced bearing 108 mounted in the housing 12 of the machine. These trip fingers extend through a slot in the front face of the housing 12 and are provided with set screws 110 to adjustably secure them to the rod 107 at any desired position. The rod 107 is pivotally connected to the lever 111 which actuates the switch 112. When the rod 107 is moved to the left by the engagement of the trip flinger 105 by the flange 104 of the nut 92 the arm 111 rotates counterclockwise and causes the switch 112 to reverse the electric circuit controlling the clutch member 70 causing the latter to disengage the tool feed clutch face 59 and engage the tool rapid retract clutch face 54 which changes the speed of the feed shaft assembly 33 causing the tools to retract, and moves the nut 92 to the right at a rapid rate. When the flange 104 of the nut 92 engages the trip finger 106 to move the rod 107 to the right and oscillate the arm 111 clockwise the switch 112 deenergizes the clutch member 70 causing it to move to the neutral position. At this time the tools have been retracted to the desired position. The operator may manually actuate the switch 112 to perform these functions without stopping the machine in case one of the tools is broken or other trouble is observed.

The collars 113 and 114 are pinned to the rod 107 adjacent each end thereof between the bearings 108. These collars will cause the machine to automatically function to change the feed to retract the tools and stop the movement of the beveled pinions 85 on the tool head before they reach either limit of their run on the threaded shanks 80 of the tool holders 77 in case the set screws 110 of the trip fingers become loosened. The safety function of the collars 113 and 114 thus prevent the drive from jamming at the limits of the tool holder strokes which would result in the stripping of some of the gears in this drive. This safety measure is an important feature of this invention.

Again the the spur gear 62 is secured to the shaft section 56 of the feed shaft assembly 33 by the bronze shear pin 115 which passes through a hole in the shaft 56 and lies in diametrical slots in the hub of the spur gear 62. If for any reason a tool breaks and the load becomes excessive this pin will shear off, causing the shaft 33 to be idly driven by the ring gear 72. This is another safety feature to protect the gears against stripping due to excessive loads.

As shown in Fig. 4 the spindle 35 is provided with a pair of inner concentric stationary guide sleeves 116 and 117 each provided with spaced radial flanges at the left end which engage at their perimeter as shown at 118 and are secured to the wall 30 by the bolts 120. The sleeve 116 is spaced from the rotary spindle 35. These stationary sleeves are also spaced from each other by the flange connection 118 at the left end and by the circularly spaced lugs 121 at the right end, thereby providing an enclosed passage therebetween and to which is fed a cutting lubricant through the pipe 122 at the left end of the guide sleeves. The lubricant is fed under pressure from the pump 123 powered by the motor 124 shown in Figs. 1 and 2. This lubricant travels through the space between the stationary sleeves 116 and 117 and is directed by the angularly disposed cylindrical mouth 125, formed by the lugs 121, onto the work where the latter is engaged by the tools 74. These guide sleeves also support the severed work pieces if the latter are completely cut off from the stock.

Referring now to Figs. 6 and 7 which illustrate the actuating mechanism of the clutch member 70, the latter is provided with an annular groove or recess 126 arranged to receive the yoke member 127 secured to the shift bar 128 that is slidably mounted in the bearings 130 in the walls 30 and 31 below and between the feed shaft assembly 33 and the drive shaft 32. The shift bar 128 is provided with a rack 131 on the under side thereof which meshes with the pinion 132 secured to the rocker shaft 133 journaled in the post 134 and the back wall of the housing 12. The rocker shaft 133 extends through the back wall 12 and has the rocker 135 with oppositely extending arms 136 and 137 formed integral therewith. When the clutch member 70 is in its neutral position the arms of the rocker are horizontal as shown in Figs. 6 and 7. Each arm is provided with a transverse pivot pin 138 which extends through the slots 139 in the lower ends of the actuating rods 140 and 141.

The upper ends of the rods 140 and 141 are pivotally connected to the armature of the electromagnetic solenoids 142 and 143.

When the solenoid 143 is energized the rod 141 lifts the arm 137 and rotates the rocker 135 counterclockwise in Fig. 6 to shift the bar 128 by means of the rack and pinion 131 and 132. The bar 128 moves the yoke 127 to the left in Fig. 6 and engages the clutch member 70 with the detent clutch face 59 to drive the feed shaft assembly 33 from the drive shaft 32 and feed the tools 74 inwardly.

Energization of the solenoid 142 rotates the rocker 135 clockwise and the bar 128 and the yoke 127 move the clutch member 70 to the right and into engagement with the detent clutch face 54 to rapidly retract the tools 74.

When both solenoids 142 and 143 are deenergized their armatures drop and the pins 138 of the rocker arms engage the tops of the slots 139 as shown in Fig. 6. In this position the rocker 135 is held in a horizontal position and the yoke 127 maintains the clutch member 70 in the neutral position. Solenoid 142 is deenergized by the arm 111 of the switch 112 rotating clockwise, the latter opening the solenoid circuit when the nut 92 strikes and moves the trip finger 106 as previously explained.

During operation the machine is rotating with the tools 74 retracted, the clutch member 70 is in neutral and the pipe 18 is set in the proper position to be cut or otherwise machined. The trip fingers 105 and 106 are set at their proper position. The finger 106 is set so that the tools 74 clear the pipe 18 and the finger 105 is set so that it will be engaged by the nut 92 when the tools 74 complete their cut. This single adjustment of the trip fingers 105 and 106 determines both the length and position of the cutting stroke required to complete the machining operation. If the pipe is large in diameter and not very thick the trip fingers are set relatively close together and adjacent the right end of the finger slot. If the work piece is a small rod the trip fingers are set relatively close together and adjacent the left end of the finger slot. If the work piece is a large diameter bar then the trip fingers are spaced apart with the trip finger 105 to the extreme left and the trip finger 106 positioned so the tools clear the work when it is engaged. Thus by pre-settting the tools 74 in the plugs 75 the machine can be quickly adjusted by moving the trip fingers to their proper position to accommodate the work piece to be machined or cut off. This feature is an important object of this invention.

With the trip fingers 105 and 106 set, the work piece in position, and the tool head 16 revolving, the solenoid 143 is energized to throw the clutch member into engagement with the feed drive. This starts the machine to function and the machining operation is then automatically completed and the table retracted before the chuck 17 or the carriage 14 can be moved as the circuit of the carriage motor 22 is interlocked with the drive to prevent the former from operating until the tools are completely retracted. This is also an important object of this invention.

The speed of the main drive motor 47 must be changed to produce the proper peripheral speed of the tool head so that the cutting tools properly perform their work regardless of the diameter of the work piece.

The operation of this machine may be initiated by a push button or by a trip effective when the carriage presents the chucked work stock in the machining position at the rotary tool head. Once initiated the machine automatically feeds the tools completing the cutting stroke, retracts the tools and at the end of the machining cycle retracts the chuck permitting the work to be reset for the next machining cycle. The feeding of the work to the tool head may be accomplished as disclosed in application Serial No. 586,402 filed April 3, 1945.

It is claimed:

1. In a machine tool the combination of a rotary tool head having an annular series of spaced threaded tool holders each arranged to carry a tool, an internally threaded pinion engaging the threaded portion of its respective tool holder and arranged when rotated to feed or retract the tools in unison to simultaneously machine a work piece, a rotary drive shaft, drive gear means between the drive shaft and the tool head to rotate the latter, tool gear means journaled axially of the tool head and arranged to mesh with said pinions to move the tools relative to the work piece when rotated at a speed different than the speed of the tool head, and means for selectively rotating the tool gear means from the drive gear means or the drive shaft to produce a relatively faster and slower speed respectively for moving the tools relative to the work piece.

2. In a machine tool the combination of a rotary tool head having an annular series of spaced threaded tool holders each arranged to carry a tool, an internally threaded pinion engaging the threaded portion of its respective tool holder and arranged when rotated to feed or retract the tools in unison to simultaneously machine a work piece, a rotary drive shaft, drive gear means between the drive shaft and the tool head to rotate the latter, tool gear means journaled axially of the tool head and arranged to mesh with said pinions to move the tools relative to the work piece when rotated at a speed different than the speed of the tool head, means for selectively rotating the tool gear means from the drive gear means or the drive shaft to produce a relatively faster and slower speed respectively for moving the tools relative to the work piece, and control means to automatically actuate said selector means to change the inward feed of the tools to a retracting movement and arrest the retracting movement after a predetermined time.

3. The structure of claim 2 characterized in that said control means is manually adjustable when the machine is in motion to determine the position and length of stroke of the tools relative to the work piece.

4. In a machine tool the combination of a rotary tool head having an annular series of spaced threaded tool holders each arranged to carry a tool, an internally threaded pinion engaging the threaded portion of its respective tool holder and arranged when rotated to feed or retract the tools in unison to simultaneously machine a work piece, a drive for rotating the tool head, means operated by the drive to move the tools relative to the work piece, and manually adjustable automatic control means for determining the position and length of the stroke of the tools relative to the work piece in an operating cycle.

5. In a machine tool the combination of a rotary tool head having an annular series of spaced threaded tool holders each arranged to carry a tool, an internally threaded pinion engaging the threaded portion of its respective tool holder and arranged when rotated to feed or retract the tools in unison to simultaneously machine a work piece, a drive for rotating the tool head, tool drive means rotatably mounted relative to the tool head and arranged to move the tools relative to the work piece when rotated at speeds different than the speed of the tool head, and manually adjustable control means to automatically select different operating speeds and synchronous speed for said tool drive means to impart the respective motions of feeding and retracting and to idle the tools in an operating cycle.

6. The structure of claim 5 characterized in that the manually adjustable control means includes a threaded shaft driven by the tool drive means, a nut threadably engaging the shaft, means for rotating the nut from the tool head drive, and manually adjustable trip fingers on each side of the nut and arranged when engaged by the latter to automatically reverse the direction of motion and to idle the tools.

7. The structure of claim 5 characterized in that the manually adjustable control means includes a threaded shaft driven by the tool drive means, a nut threadably engaging the shaft, means for rotating the nut from the tool head drive, a three-way switch, a rod to actuate the switch, a pair of trip fingers adjustably secured to the rod and disposed on opposite sides of and in the path of the nut to actuate the switch, and means controlled by the switch to automatically reverse the direction of motion and to idle the tools.

8. The structure of claim 5 characterized in that the feeding and retracting motion and the idling of the tools are performed and repeated automatically in progressive steps to complete operating cycles of the tools.

9. In a machine tool the combination of a rotary tool head having an annular series of spaced threaded tool holders each arranged to carry a tool, an internally threaded pinion engaging the threaded portion of its respective tool holder and arranged when rotated to feed or retract the tools in unison to simultaneously machine a work piece, a drive for rotating the tool head, tool drive means rotatably mounted relative to the tool head and arranged to engage said pinions to move the tools toward and away from the work piece when rotated at speeds different than the speed of the tool head and arranged to maintain the position of the tools when rotated in synchronism with the tool head, manually adjustable trip means to automatically select different operating speeds and synchronous speed for the tool drive means to feed and retract and to idle the tools for tool cutting strokes of predetermined position and length, and limit control means to change the tool feed movement to retracting movement at the ultimate limit of the tool feed and to idle the tools at the ultimate limit of the tool retraction.

10. The structure of claim 9 characterized in that the trip means actuates the ultimate control means when the former is not fixed to produce a predetermined tool stroke.

11. In a machine tool the combination of a rotary tool head, a tool holder having a threaded section mounted in the head and retained against rotary movement of its axis, a tool socket in said holder, a nonrotary tool plug adapted to be secured in the socket at a fixed depth, a tool arranged to be adjustably mounted in the plug, a pinion having a threaded bore to fit the thread section of the holder and retained against axial movement by the head, a gear rotatably mounted relative to the head to engage the pinion, and positive drive means to rotate said gear to move the tool relative to a work piece.

12. The structure of claim 11 which also includes means for enclosing and sealing the tool holder.

13. The structure of claim 11 which also includes friction means engaging the pinion and prevents its rotation to hold the tool against movement relative to the work piece when said positive drive means is not effective.

STEWART C. HIBBARD,
ROBERT L. HIBBARD, Jr.,
HAYS M. JUNKIN,
Executors of Robert L. Hibbard, Deceased.

REFERENCES CITED

The following references are of record in the file of this patent:

UNITED STATES PATENTS

| Number | Name | Date |
|---|---|---|
| 490,427 | Childs | Jan. 24, 1893 |
| 723,358 | Bradford | Mar. 24, 1903 |
| 1,159,828 | Carnes | Nov. 9, 1915 |
| 1,180,387 | Curtis | Nov. 16, 1915 |
| 1,828,371 | Hyde et al. | Oct. 20, 1931 |
| 1,894,784 | O'Connor et al. | Jan. 17, 1933 |

FOREIGN PATENTS

| Number | Country | Date |
|---|---|---|
| 1,068 | Great Britain | Apr. 8, 1869 |